United States Patent
Bowles et al.

[15] 3,687,147
[45] Aug. 29, 1972

[54] JET VELOCITY AUGMENTATION APPARATUS

[72] Inventors: Romald E. Bowles; Ronald D. Stouffer, both of Silver Spring, Md.

[73] Assignee: Bowles Fluidics Corporation, Silver Spring, Md.

[22] Filed: Aug. 5, 1970

[21] Appl. No.: 61,491

Related U.S. Application Data

[63] Continuation of Ser. No. 716,215, March 26, 1968, abandoned.

[52] U.S. Cl. .................................. 137/1, 137/81.5
[51] Int. Cl. ............................................. F15c 1/14
[58] Field of Search ............... 137/81.5, 1; 235/201

[56] References Cited

UNITED STATES PATENTS

| | | | |
|---|---|---|---|
| 3,411,520 | 11/1968 | Bowles | 937/81.5 |
| 3,238,959 | 3/1966 | Bowles | 137/81.5 |
| 3,262,466 | 7/1966 | Adams et al. | 137/81.5 |
| 3,275,016 | 9/1966 | Wood | 137/81.5 |
| 3,277,915 | 10/1966 | Dockery | 137/81.5 |
| 3,334,640 | 8/1967 | Phillips | 137/81.5 |
| 3,380,465 | 4/1968 | Rona | 137/81.5 |
| 3,457,935 | 7/1969 | Kantola | 137/81.5 |
| 3,504,690 | 4/1970 | Rose | 137/81.5 |
| 3,508,563 | 4/1970 | Ripley | 137/81.5 |

OTHER PUBLICATIONS

" The Amateur Scientist," C. L. Stong, Scientific American, Vol. 207, No. 2, Aug. 1962. pp. 128– 138.

*Primary Examiner*—Samuel Scott
*Attorney*—Rose and Edell

[57] ABSTRACT

A jet velocity augmentation scheme employs a pulsed fluid source of relatively incompressible fluid which produces at least two fluid jets which are caused to impact on one another with the leading faces of the fluid jets at a relatively small angle, for instance $\leq$ 60° with a centerline between the faces. A shaped charge effect is produced as the result of collapse of a cavity defined between the faces of the fluid slugs. Augmentation of jet velocity results and increases of velocity of the order of 3.5 to 11.5 times may result depending upon the angle of the faces of the fluid slugs. This results in corresponding final velocity pressure amplification of the order of 12.25 to 132.25 times the original velocity pressure.

9 Claims, 5 Drawing Figures

INVENTORS
ROMALD E. BOWLES
& RONALD STOUFFER

BY Hurvitz, Rose & Greene

ATTORNEYS

JET VELOCITY AUGMENTATION APPARATUS

CROSS REFERENCE

This application is a continuation of our prior application Ser. No. 716,215, filed Mar. 26, 1968, now abandoned, entitled JET VELOCITY AUGMENTATION APPARATUS.

PRIOR ART

Numerous attempts have been made in the prior art to erode or fracture materials by use of high velocity jets of water or other "incompressible" fluids. (The term "incompresible" as used herein refers to liquids, such as water, that are substantially incompressible at atmospheric pressures. At the pressure at which the apparatus of the present invention operates, the liquids are at least partially compressible.) Normally, these approaches have been concerned with imparting very high velocities to water and as a result to provide a high energy stream of fluid capable of rapidly eroding or fracturing the material to be treated. The various approaches have been in the form of providing high pressure sources coupled with nozzle and system designs to minimize losses; and rapidly accelerating slugs of water by one means or another, such as by means of explosions to impart high velocities to the water. Each of the various approaches may be termed successful or unsuccessful in relationship to the amount of energy expended to provide a particular effect in the specific material to be treated. Thus, one of the prior art systems might be useable for eroding or fracturing a given material, a soft material for instance, whereas it would be considered unacceptable for use with harder materials.

SUMMARY

In accordance with the present invention, there is provided a relatively economic system for producing very high velocity jets of incompressible fluid such as water. The present invention employs shaped-charge techniques in a liquid system to achieve high velocity jet augmentation with equipment that is economical in the context of results. Specifically, two passages are aimed at each other at such an angle that the end surfaces of the passages have an angle $\alpha$ of approximately not more than 30° with an axis symmetrically disposed relative to the end surfaces. The end surfaces of the passages define a cavity therebetween which is relatively narrow at the closest points between the two passages and which cavity flares outwardly at an angle defined by the angle between the ends of the passages. The passages are caused to emit, intermittently, discrete jets of water so that the jet leading surfaces in traveling toward one another collapse the cavity therebetween and produce a very high velocity jet in a direction proceeding away from the closest point between the two passages.

It has been found that with an angle $\alpha$ of not more than 30°, jet velocities may be increased by at least 3.5 times and up to an infinitely large increase when $\alpha = 0$, i.e. with the two ends of the passages parallel to one another. Since the amount of fluid, i.e. the mass of fluid in the velocity augmented jet decreases as the angle $\alpha$ decreases, there is an optimum angle beyond which the velocity augmentation no longer offsets the loss of mass; this angle being somewhat less than 30°.

Various techniques are known for producing the necessary intermittent but concurrent flow of water jets or slugs toward one another so as to collapse the cavity between the jets and produce augmentation. The apparatus is, considering the amplification achieved, relatively economical. It is an object of the present invention to employ shaped charge theory in a fluidic jet velocity augmentation system.

It is another object of the present invention to provide a mechanism by which two jets of relatively incompressible fluid such as water are intermittently directed toward one another at a prescribed angle to collapse a cavity define between the leading surfaces of the jets whereby augmentation of jet velocity is achieved.

The above and still further objects, features and advantages of the present invention will become apparent upon consideration of the following detailed description of several embodiments thereof, especially when taken in conjunction with the accompanying drawings, wherein.

Figure 1:
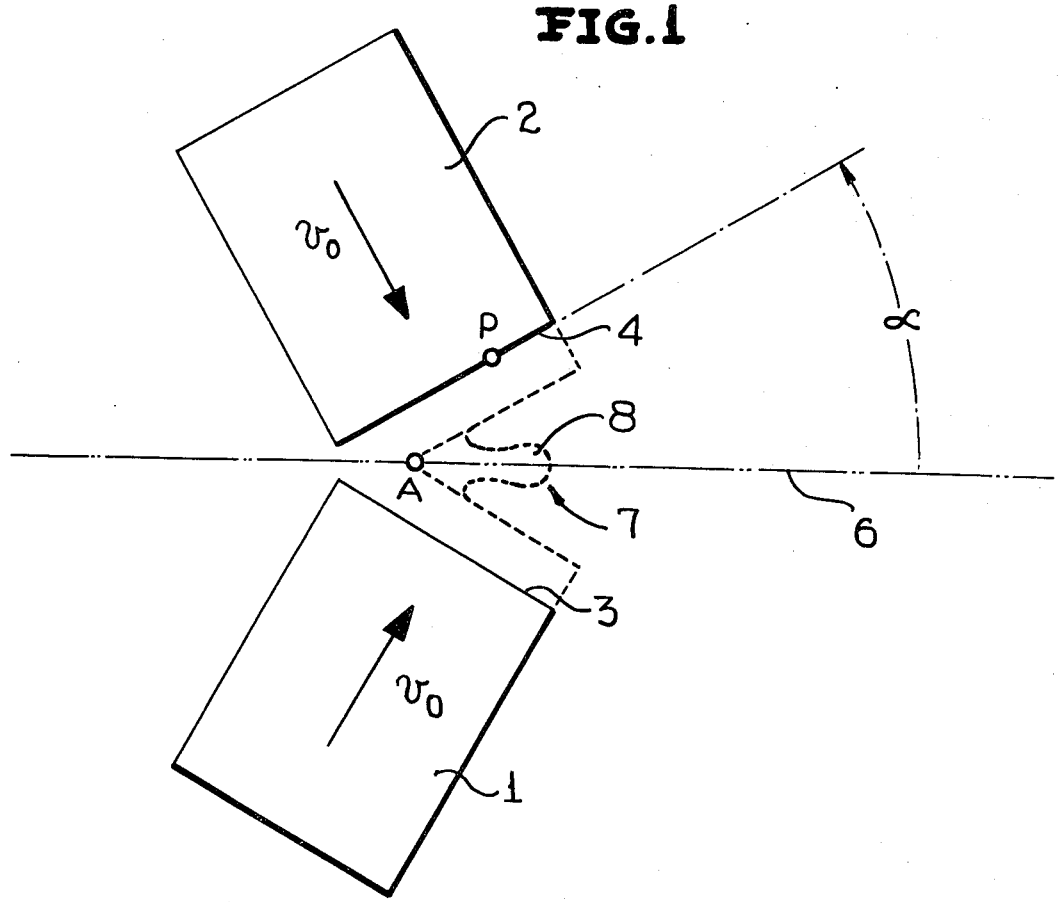
FIG. 1 is a diagrammatic view of the relationship between the leading surfaces and motion of liquid jets necessary to produce shaped-charged jet velocity augmentation.

Referring specifically to FIG. 1 of the accompanying drawings, there is illustrated in diagrammatic form a jet augmentation scheme wherein are illustrated a first jet of water 1 and a second jet of water 2 having front surfaces 3 and 4, respectively, lying at a prescribed angle $\alpha$ relative to a centerline 6 symmetrical with respect to the faces 3 and 4 of the jets 1 and 2.

The faces 3 and 4 define a region generally designated by the reference numeral 7 hereinafter called a cavity which at an instant of time illustrated by the solid line portion of the diagram of FIG. 1, is open at its left end by a very small margin and is opened at its right end by a relatively large distance due to the inclination of the faces 3 and 4 relative to one another. It is assumed that the jets 1 and 2 are well defined in space and are proceeding through space toward one another at velocities $V_o$ plotted as the vector $V_o$ in the vector diagram of FIG. 2. Assume that the point A in the diagram of FIG. 1 is the point of intersection of the faces 3 and 4. As the jets 1 and 2 contact one another progressively during a period of time, the point A thus moves from left to right in the diagram of FIG. 1 at a speed $$V_1 = \frac{V_0}{\sin \alpha}$$

Figure 2:
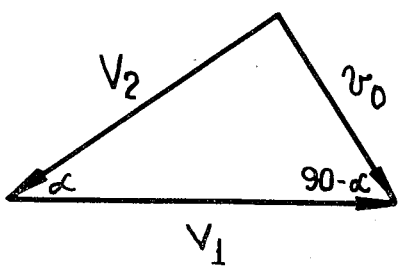
FIG. 2 is a vector diagram of the velocities of the various elements of FIG. 1.

A point P is assumed to be a point on the surface of the surface 4 of the jet 2 but could be just as well a point on the surface 3 of the jet 1. If an observer is positioned on A, the point P moves toward the point A at a velocity of $V_2$ which is the vector difference between the velocity $V_o$ and $V_1$ where $V_1$ is illustrated in FIG. 2 as the velocity of the point A from left to right. The above statement is based on the fact that an observer standing on A will appear to himself to be standing still and the point P will appear to be approaching him from a position initially downstream and above the point A. Thus, the vector $V_2$ assumes the direction illustrated in FIG. 2 and has an amplitude defined by the equation $$V_2 = \frac{V_0}{\tan \alpha}$$

Again referring to the observer on point A, during collapse of the cavity, he will see a small quantity of fluid moving outwardly in front of him (i.e. from left to right in FIG. 1) and a large quantity of fluid moving to the left of him. This can readily be seen intuitively since the point A is defined by the point of intersection of the faces 3 and 4 which is moving from left to right and at any given instant fluid occupying the point A must move away from point A to make room for fluid approaching the point as the faces 3 and 4 approach one another. Specifically, the fluids must move relative to the point A at the same velocity that the fluid approaches which, as indicated above, is the velocity $V_2$.

This conclusion can be reached by another approach. So far as the observer at point A is concerned, during collapse of the cavity, a steady state motion exists all about him. This statement assumes that the boundary streamlines of the system are all at the same pressure; that is, the boundaries around the slugs $V_1$ and $V_2$ and around the cavity 7 are all at the same static or ambient pressure. With the above conditions existing, Bernoulli's Theorem ($P_s + \frac{1}{2} \rho V^2 = K$) applies as an approximation and the velocity of the fluid at any point in the system is determined by the pressure at that point. As indicated, the boundary streamlines are at a constant pressure and the velocity at all boundary points is identical. Thus, to the observer at point A, the mass behind him and the jet formed in front of him recede at the same velocity that the walls appear to approach him; namely, the velocity $V_2$. In consequence, the forward moving jet moves along the axis 6 at a velocity $V_2$ relative to the point A, and the mass forming behind point A appears to the observer to recede at the same velocity $V_2$.

Relating the velocity vectors now to the ambient coordinates, or what may be called the laboratory coordinates, the velocity ($V_J$) of the jet formed in front of the point A is $V_1 + |V_2|$, and the fluid to the left of the point A as viewed in FIG. 1 moves with a velocity $V_s = V_1 - |V_2|$. Substituting in the equation for $V_J$ from the equations defined above $$V_J = \frac{V_0}{\sin \alpha} + \frac{V_0}{\tan \alpha} = \frac{V_0}{\sin \alpha} (1 + \cos \alpha)$$

From the above equation, it is seen that if, for instance, the sin $\alpha$ is 10°, the amplification factor very closely approximates 11.5 times the velocity $V_0$. As $\alpha$ approaches 0, the sin $\alpha$ approaches 0 and the amplification theoretically approaches infinity and practically becomes quite high. However, the mass diminishes as a function of sin $\alpha$ and impact of the fluid has little total effect. Thus in any system, the angle $\alpha$ so long as it is less than 90° produces velocity augmentation but as a practical matter must be chosen with an eye toward the ultimate velocity desired with a particular mass of liquid.

As to the amount or mass of liquid, the principle of conservation of momentum holds and it can be shown that the mass of fluid associated with the velocity-augmented jet is equal to $m/2 (1 - \cos \alpha)$. For an angle $\alpha$ of 10°, the mass of fluid associated with the augmented jet is 0.075 times the original mass of the jets. However, impact pressure is of primary concern in a system of this type and the impact pressure is related to $V^2$ of the augmented jet. At an angle 10°, the jet velocity pressure $P_J = \frac{1}{2} \rho V^2$ is 132 times that of the initial jet velocity pressure of $P_o = \frac{1}{2} \rho V_o^2$. Thus, very high velocity pressures may be generated. As indicated above, the mass of liquid in the velocity augmented jet is a function of the initial mass of the slug among other things. Thus, even though $\alpha$ may be a small angle, a relatively large diameter slug of appropriate length will assure the desired results. The length of the slug does not affect the size of the cavity but does contribute to the mass of the fast jet. From an energy consumption standpoint, the length, however, should be short enough not to establish a steady state effect when considering the rate at which liquid jet pulses or slugs are generated.

Figure 3:
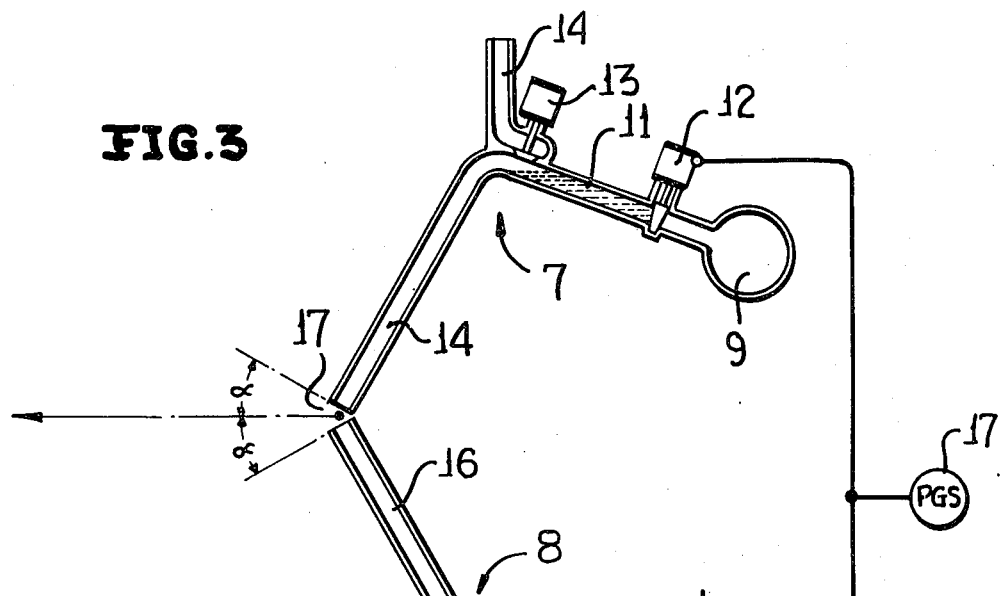
FIG. 3 is a schematic diagram of an apparatus for producing high velocity liquid slugs.

As an example, an apparatus that may be employed to produce pulsed liquid jets is disclosed in co-pending application Ser. No. 652,860 by Romald E. Bowles filed on July 12, 1967 and assigned to the assignee of the present application. Referring specifically to FIG. 3 of the accompanying drawings, two systems, as illustrated in FIG. 3 of the aforesaid application, may be employed to provide the necessary pulsed fluid jets. In FIG. 3, there are two liquid velocity amplification devices generally designated by the reference numerals 7 and 8. The apparatus is operated with a source of high pressure 9 which is intermittently admitted to a region 11 by means of an electromagnetically controlled gate valve 12. The source 9 is a gas source and is adapted to drive a liquid in region 11, the liquid being admitted to region 11 by means of an electromagnetically controlled valve 13, from a pipe 14 connected to an appropriate source of liquid.

The apparatus 8 is substantially identical in construction with the apparatus 9 and the elements of apparatus 8 corresponding to those illustrated relative to device 7 bear the same reference numerals but have primes. The electro-magnets 12 and 12' control the admission of high pressure gas behind liquid slugs 11 and 11' so that the liquid slugs are propelled down the elongated tubes 14 and 16 of the apparatus 7 and 8, respectively. The tubes 14 and 16 are of equal length and the magnets 12 and 12' are operated by the same electrical control or pulse controlled source designated by reference numeral 17. Thus, both magnets are operated at the same moment. The electromagnets 13 and 13' may be operated also from the same source but their opening and closing does not have to be timed precisely so long as the values operated thereby are closed before the valves 12 and 12' are open.

The apparatus 7 and 8 produce high velocity slugs of liquid and the faces of the tubes 14 and 16 define a cavity 17 which is collapsed by the jets of liquid emitted from the ends of the pipes 14 and 16. Since the apparatus 7 and 8 operate on a pulsed timed sequence, the delivery of fluid slugs may be timed to insure that liquid emitted during a prior cycle is completely dissipated from the region and the collapsible cavity is redefined permitting the shaped-charge phenomenon to again occur.

Referring again to FIG. 1 of the accompanying drawings the leading faces 3 and 4 of the jets 1 and 2 are idealized for purposes of discussion. In a practical apparatus, the faces 3 and 4 will be deformed to a greater or lesser extent relative to that illustrated. In some instances, it may be advantageous to provide a convex end surface on the jets to initially increase the rate of movement of the augmented jet from left to right and subsequently reduce the rate. To some extent, distortion of the leading surface results from the fact that the slug is a free jet; that is, the slug constitutes an unconfined liquid flow in a gas medium. In any event, when the surfaces 3 and 4 are distorted either intentionally or unintentionally, the angle $\alpha$ changes and therefore it may be well to use as a plane of reference for apparatus purposes at least the angle $\pi° - \alpha$ which is the angle between the axis 6 and the longitudinal centerline of each slug 1 and 2.

Referring now to FIG. 3, if an angle $\alpha = 30°$ is desired, then the axis of the passages 14 and 16 should each be at an angle of 60° to the axis of the augmented jet, i.e. the centerline of the apparatus. The apparatus of FIG. 3 actually employs two velocity augmentation devices so that the velocities of the two jets delivered to collapse the cavity may initially be quite high with the resultant augmented jet at extremely high velocities. The apparatus of FIG. 3 is just one mechanism for realizing the advantages to be gained by the theory of the present invention and FIG. 4 illustrates a further embodiment of such an apparatus.

Figure 4:
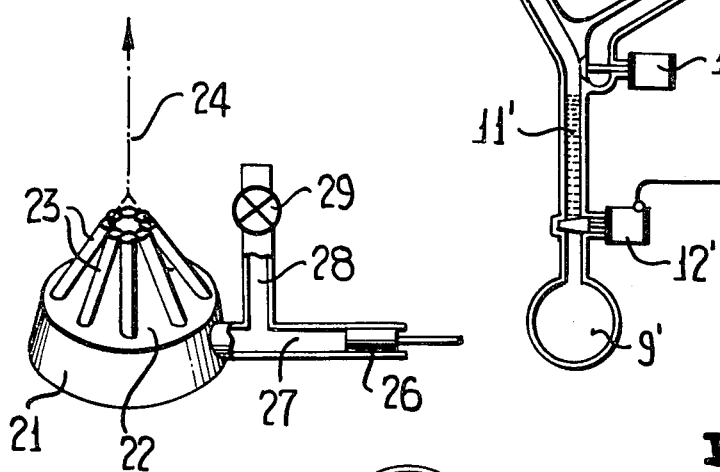
FIG. 4 is a schematic diagram of a second embodiment of apparatus for intermittently producing high velocity liquid jets.

In FIG. 4, there is provided a hollow tank generally designated by the reference numeral 21 having, in the position illustrated in FIG. 4, an upper surface 22 through which extends a plurality of hollow tubes 23, the interior of the hollow tubes 23 are secured to and extend through the surface 22 into communication with the interior of the vessel 21. The tubes 23 are arranged relative to axis 24 of the tank 21, that fluid slugs emitted by all the tubes contact axis 24 at the same distance from the surface 22 with the faces of the slugs at an angle $\alpha$ as prescribed in the discussion in FIGS. 1 and 2.

It can be seen that by employing an apparatus such as that illustrated in FIG. 4, a plurality of slugs which are generated in a manner to be described subsequently are directed at an a single location along the axis 24, which in conformity with FIG. 1 is designated by the letter A, and define a generally conical cavity bounded substantially on all sides by slugs of liquid when the device is operated. Thus, the apparatus of FIG. 4 more closely approximates a true shaped-charge configuration in that the slugs emitted by the tubes 23 define a relatively complete conical surface about the cavity which is collapsed as the slugs proceed toward the centerline 24.

In operation, in the example illustrated in FIG. 4, a large area short stroke piston 26 is connected to an appropriate mechanism for rapidly moving the piston in a direction from right to left in a tube 27 communicating with the interior of the tank 21. The apparatus may be filled through a side tube 28 communicating, for instance, with the tube 27 through a check valve 29. The tube 28 is connected to a source of incompressible liquid such as a pump and the apparatus is filled to the upper ends of the tubes 23. Upon rapid stroking of the piston 26 which, as indicated above, is a large area short stroke piston, water is emitted concurrently from the ends of all of the tubes 23 so long as the piston 26 is moving. As soon as the piston 26 terminates movement to the left, the flow from the ends of the tubes 23 is terminated. By determining the length of the stroke of the piston 26, the size of the slugs emitted by the tubes 23 is determined. Between intervals of movement of the piston to the left, the apparatus is refilled from the passage 28.

Somewhat the same effect can be achieved by removing the tubes 23 and merely working with the holes projecting through the upper plate or surface 22 of the chamber 21. In such case, however, it is desirable that the member 22 be relatively thick so that well-defined passages are provided for the apparatus. Also, it should be noted that the piston 26 may actually form the bottom surface, as illustrated in FIG. 4, of the chamber 21 rather than being disposed in a side arm as illustrated.

Figure 5:
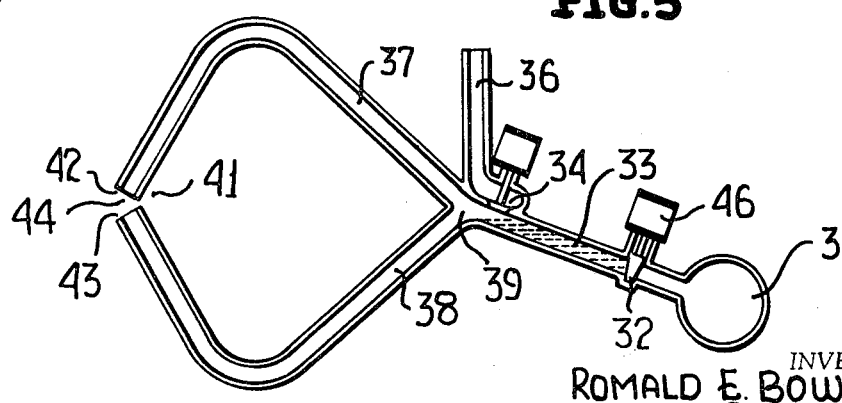
FIG. 5 is a schematic diagram of a variation of the apparatus of FIG. 3.

Referring now specifically to FIG. 5 of the accompanying drawings, there is illustrated a modification of the apparatus of FIG. 3 in the present application. The same basic concept of two devices for supplying velocity augmented jets to collapse a cavity is employed in FIG. 5; however, only a single source of gas pressure and a single source of liquid is employed. Specifically, a single source of pressure 31 is provided behind a gate valve 32 which isolates the source from a region 33 into which water may be introduced. Water is introduced into the region 33 through a solenoid actuated valve 34 from a water or liquid conduit 6 connected to a suitable supply. The region 33 communicates with two passages 37 and 38 which join with the passage 33 at a Y-junction, generally designated by the reference numeral 39. The passages 37 and 38 terminate in faces 42 and 43, respectively, forming a cavity 44 therebetween.

In operation, the valve 34 is opened by appropriate means such as by a solenoid and the region 33 is filled with water or other suitable liquid. After filling of the region 33, the valve 34 is closed and at some later time the gate valve 32 is opened as by means of another solenoid. The pressurized gas of the source 31 is introduced behind the liquid which is now accelerated through the channels 37 and 38 to collapse the cavity 44 at the outlets of the passages. After a predetermined and relatively short interval, the valve 32 is closed so as to terminate the jet and permit a new charge to be developed in the region 33 for subsequent propulsion by the pressurized gas of the source 31.

The devices of FIGS. 3 and 5 on the one hand and FIG. 4 on the other illustrate the utilization respectively of gas and water pressure for generation of the discrete liquid jets. The mechanisms for generating the various pressures may be quite diverse. Any number of techniques for generating impulses of relative high pressure in fluid conduits are available.

While I have described and illustrated several embodiments of my invention, it will be clear that variations of the details of construction which are specifically illustrated and described may be resorted to without departing from the true spirit and scope of the invention as defined in the appended claims.

I claim:

1. A jet velocity augmentation apparatus comprising means for propelling a first discrete jet of incompressible liquid in free space toward a first axis along a second axis lying at an angle of 90° − α with respect to said first axis, and at least a second means for propelling a second discrete jet of incompressible liquid in free space toward said first axis along a third axis lying generally in the same flat plane as said other axes and at an angle of 90° −α with respect to said first axis in a direction such that both said jets have a component of velocity in the same direction along said first axis, said jets having leading surfaces such as before impact to define a tapered cavity therebetween flowing outwardly in the direction of said component of velocity of said jets along said first axis, said means for propelling said jets including means for causing said leading surfaces of said jets to arrive at said first axis at substantially identical times so as to impact and collapse said cavity, said angle α being a maximum of approximately 30°, said apparatus defining an unconfined space such that said jets impact in free space to form a shaped liquid jet in free space.

2. The combination according to claim 1 wherein said means for propelling include further means for concurrently and periodically propelling slugs of said liquid toward one another.

3. The combination according to claim 1 wherein said jets have leading surfaces adjacent said first axis which are generally transverse to their respective axes of movement.

4. The combination according to claim 3 comprising a plurality of means for propelling jets along axes forming angles of 90° − α with said first axis whereby to define a pattern of liquid jets having a generally conical composite pattern of said leading surfaces defining said cavity.

5. A jet velocity augmentation apparatus comprising passage means for conveying a fluid, said passage means directing fluid along flow paths generally symmetrical with respect to a common axis with each flow path lying at an angle of 90° − α with respect to said common axis, said passage means defining flow paths each directed toward and having a projection on said common axis directed in the same direction as each of the other projections, and operating means causing said passage means to initiate along all said flow paths concurrently discrete slugs of incompressible liquid of finite length and duration, said apparatus defining an unconfined space and uninterrupted flow path for said slugs of liquid such that said slugs interact with one another in free space to form a shaped liquid jet in free space.

6. The combination according to claim 5 wherein said operating means includes means for producing in synchronism along all flow paths periodic liquid flow.

7. A jet velocity augmentation apparatus comprising means for propelling discrete slugs of incompressible liquid in free space toward a first axis along a second axis lying at an angle of 90° − α with respect to said first axis from a location upstream of a point of intersection of said axes, means for defining a barrier along said first axis to prevent further movement of said slugs parallel to said second axis, said barrier being such as to redirect said liquid to flow generally parallel to said first axis, said slugs each having a leading surface generally perpendicular to said second axis, said apparatus defining an open region and an uninterrupted flow path for said slugs such that said slugs impact upon said barrier to form a shaped liquid jet in free space, said slugs being issued from a location sufficiently proximate said barrier to prevent deterioration of said leading surface prior to impact of said slugs upon said barrier, said leading surface and said barrier defining a tapered cavity therebetween, said tapered cavity flowing outwardly along said first axis, wherein α is an angle of approximately 30° maximum.

8. A method of augmenting the velocity of a fluid jet comprising the steps of:
propelling a first series of discrete slugs of incompressible fluid in free space along a first axis and toward a second axis which intersects said first axis at an angle of 90° −α, where α is an angle of approximately 30° maximum;
propelling a second series of discrete slugs of incompressible fluid in free space along a third axis and toward said second axis which intersects said third axis at an angle of 90° −α and said first axis at an angle of 180° −2 α said first, second and third axes being co-planar and intersecting at a common point in free space;
propulsion of said first and second series of slugs being synchronized such that each slug from said first series impacts with a corresponding slug from said second series in free space in the vicinity of said common point to form a shaped fluid jet directed along said second axis.

9. A jet velocity augmentation apparatus comprising means for propelling discrete slugs of incompressible liquid in free space toward a first axis along a second axis lying at an angle of 90° − α with respect to said first axis from a location upstream of a point of intersection of said axes, means for preventing further movement of said slugs parallel to said second axis, said means for preventing being such as to redirect said liquid to flow generally parallel to said first axis, said slugs each having a leading surface generally perpendicular to said second axis, said apparatus defining an open region and an uninterrupted flow path for said slugs such that said slugs impact upon said means for preventing to form a shaped liquid jet in free space, said slugs being issued from a location sufficiently proximate said means for preventing to preclude substantial deterioration of said leading surface prior to impact of said slugs upon said means for preventing, said leading surface and said means for preventing defining a tapered cavity therebetween which flows outwardly along said first axis, wherein α is an angle of approximately 30° maximum.

* * * * *